(12) United States Patent
Round et al.

(10) Patent No.: US 9,187,178 B2
(45) Date of Patent: Nov. 17, 2015

(54) PREMIUM CLASS AIRCRAFT PASSENGER SUITE WITH SEPARATE SEATING AREAS

(71) Applicant: B/E Aerospace, Inc., Wellington, FL (US)

(72) Inventors: Matt Round, London (GB); Martin Darbyshire, London (GB); Ollie Price, London (GB); Lucas Tretout, London (GB); Weiwei He, London (GB); Tommy George Plant, Advance, NC (US); Glenn Allen Johnson, Rural Hall, NC (US)

(73) Assignee: B/E Aerospace, Inc., Wellington, FL (US)

( * ) Notice: Subject to any disclaimer, the term of this patent is extended or adjusted under 35 U.S.C. 154(b) by 134 days.

(21) Appl. No.: 13/798,489

(22) Filed: Mar. 13, 2013

(65) Prior Publication Data

US 2013/0248653 A1  Sep. 26, 2013

Related U.S. Application Data

(60) Provisional application No. 61/613,077, filed on Mar. 20, 2012, provisional application No. 61/613,011, filed on Mar. 20, 2012, provisional application No. 61/613,036, filed on Mar. 20, 2012, provisional application No. 61/613,047, filed on Mar. 20, 2012.

(51) Int. Cl.
*A47C 15/00* (2006.01)
*B64D 11/06* (2006.01)

(52) U.S. Cl.
CPC ............ *B64D 11/06* (2013.01); *B64D 11/0606* (2014.12); *B64D 11/0638* (2014.12); *B64D 11/0641* (2014.12); *Y02T 50/46* (2013.01)

(58) Field of Classification Search
CPC ................................. B64D 11/00; B64D 11/06
USPC ............ 297/118, 135, 232; 244/188.5, 188.6
See application file for complete search history.

(56) References Cited

U.S. PATENT DOCUMENTS

| | | | | |
|---|---|---|---|---|
| 7,188,806 B2 * | 3/2007 | Beroth | ...................... | 244/122 R |
| 7,837,262 B2 * | 11/2010 | Merensky | ................... | 297/217.3 |
| 8,011,723 B2 * | 9/2011 | Park et al. | ..................... | 297/118 |
| 2007/0170310 A1 * | 7/2007 | Bock et al. | ................. | 244/118.5 |
| 2011/0210205 A1 * | 9/2011 | Bock et al. | ................. | 244/118.6 |
| 2011/0253838 A1 * | 10/2011 | Bettell | ....................... | 244/118.6 |

* cited by examiner

*Primary Examiner* — Philip Gabler
(74) *Attorney, Agent, or Firm* — Shumaker, Loop & Kendrick, LLP (57) ABSTRACT

A transportation passenger suite, including first and second spaced-apart end walls that define an at least partial enclosure adapted to be positioned along a longitudinal axis of a passenger cabin. A first seating assembly is positioned in the enclosure adjacent the first end wall of the passenger suite and facing in a first direction. A second seating assembly is positioned in the enclosure adjacent the second end wall of the passenger suite and faces in a second direction generally perpendicular to the first direction. A first table is positioned in the enclosure for use by an occupant seated in the first seating assembly, and a second table is positioned in the enclosure for use by an occupant seated in the second seating assembly.

10 Claims, 12 Drawing Sheets

PREMIUM CLASS AIRCRAFT PASSENGER SUITE WITH SEPARATE SEATING AREAS

TECHNICAL FIELD AND BACKGROUND OF THE INVENTION

The present invention relates to a premium class aircraft passenger suite that includes several unique features that provide enhanced passenger comfort, weight savings and efficient space utilization. The passenger suite includes a separate seat and bed that permit the seat and bed structures to be optimized for sitting and sleeping, respectively. Other features permit the passenger suite to be efficiently used by the passenger for sleeping, working, dining and video viewing.

Conventional prior art aircraft passenger suite tables are typically provided as a unit that deploys from a storage area in the seat arm rest or in a separate storage area proximate the seat. This application discloses dining and work tables that deploy from an area of the suite away from the main passenger seat and instead are used in combination with a separate dining and work chair positioned at right angles to the main passenger seat. Part of the invention also includes the provision of a bed that is a separate and distinct structure from the passenger seat and that deploys into a flat sleeping surface having a proper firmness, and that is already covered with a sheet or other bed covering. An integral tensioning system assists in deploying and stowing and deploying the bed.

The table arrangement provides tables that are a sufficiently large size to serve a full meal service within the confines of the airline passenger suite. They are able to operate completely independent of each other, making the space more flexible for the passenger and giving the airline the opportunity to market more sophisticated experiences to their premium class customers.

The novel table arrangement disclosed in this application provides two completely separate seating positions within the passenger suite. These separate seat positions enable each to be designed for its specific function without the need to compromise with the demands of the other seat position.

By creating separate positions for the premium class passengers within their space, it encourages them to get up and move about within the suite, which may reduce the incidence of deep vein thrombosis (DVT) caused by sitting in the same position for long periods time.

Furthermore, by offering two separate tables, two passengers may dine in the same suite without the need to share one dining table or perch on a small buddy seat.

Conventional prior art aircraft passenger suite tables are typically provided as a unit that deploys from a storage area in the seat arm rest or in a separate storage area proximate the seat. This application discloses an automatically-extending dining table that stows horizontally in a space shorter than its deployed length. It is mounted on a pivoting arm which moves the table from its stowed position to its deployed position. As the table pivots to its deployed position, a cable that connects the pivot point of the table arm to a rack and pinion arrangement in the arm drives the table leaf from its stowed position to its extended position. This results in the table being deployed to the centerline of the main passenger seat. A second pivot point beneath the leaf of the table allows the table to be positioned parallel to the passenger at any point of its movement. This gives a range of positions so that people of all sizes can find a comfortable position for the table.

The suite includes, in addition to the table arrangement described above, a second table that is used by the occupant of a work/dining chair and operates completely independently of the main passenger seat table, making the space more flexible for the passenger and giving the airline the opportunity to market more sophisticated experiences to their customers.

The novel table arrangement provides two completely separate seated positions, both with a proper chair, within the passenger suite. These separate seat positions enable each to be designed for its specific function without the need to compromise with the demands of the other seat position.

Conventional prior art aircraft passenger suite tables are typically provided as a unit that deploys from a storage area in the main passenger seat arm rest or in a separate storage area proximate the seat. This means, of course, that the main passenger seat is also the seat used for dining and working. This arrangement is most often necessary because of space requirements, but is not ideal. Premium class passenger seats are typically relatively soft and place the seat occupant in a somewhat reclined seated position even when the seat back is in the upright taxi, takeoff and landing position. This position is suitable for reading, relaxing, and watching video entertainment but requires the occupant to lean forward slightly to eat or work. Prior art premium class suites have not addressed this issue in a completely suitable manner. This application discloses a passenger suite that provides the premium class passenger with both a main passenger seat for "relaxation" and a separate chair and table for dining and working, with both the table and chair specially designed for those functions. Thus, the suite includes, in addition to table for use with the main passenger seat, a work/dining table that is used by the occupant of a work/dining chair and operates completely independent of the main passenger seat table, making the space more flexible for the passenger and giving the airline the opportunity to market more sophisticated experiences to their premium class customers.

Premium class aircraft passenger suites typically provide the premium class passenger with a large, comfortable seat that has a number of motor-actuated adjustments for various purposes. Controls are also provided for electronic entertainment devices and the like. As the number of passenger operated controls increases, the control consoles are typically either made larger or the individual control buttons and switches made smaller. As a result, the controls take up additional space that could otherwise be used for other purposes, or become more difficult to operate.

As disclosed in this application, the passenger seat controls are contained in a console mounted in a rotating pivot mechanism used for deploying the main passenger seat dining table. This rotating pivot mechanism overlaps its space with the passenger seat controls. When the table is deployed, it rotates around the seat control console. Sharing mechanism space between the electronic seat control unit and the dining table deployment mechanism compacts the space in which these mechanisms function. The benefits of this arrangement include permitting the same amount of space to be used to fit more features into the same footprint on board the aircraft and freeing up space for the passengers to utilize for the items they bring on board with them.

This application discloses an automatically-extending dining table that stows horizontally in a space shorter than its deployed length. It is mounted on a pivoting arm which moves the table from its stowed position to its deployed position. As the table pivots to its deployed position, a cable that connects the pivot of the table arm to a rack and pinion arrangement in the arm drives the table leaf from its stowed position to its extended position. This results in the table being deployed to the centerline of the main passenger seat.

A second pivot beneath the leaf of the table allows the table to be positioned parallel to the passenger at any point along its range of movement. This gives a range of positions so that seat occupants of all sizes can find a comfortable position for the table.

The suite includes, in addition to the table arrangement described above, a second table that is used by the occupant of a work/dining chair and operates completely independent of the main passenger seat table, making the space more flexible for the passenger and giving the airline the opportunity to market more sophisticated experiences to their customers.

SUMMARY OF THE INVENTION

Therefore, it is an object of the present invention to provide a premium class aircraft passenger suite bed that is separate from the aircraft main passenger seat, referred to in this application as the "main seat".

It is a further object of the invention to provide a premium class aircraft passenger suite that is optimized for dining, working, sleeping and video viewing within a compact, space-efficient position.

It is a further object of the invention to provide a premium class aircraft passenger suite with tables that are able to operate completely independent of each other, making the space more flexible for the passenger.

It is a further object of the invention to provide a premium class aircraft passenger suite with a table arrangement that provides tables of a sufficiently large size to serve a full meal service within the tight confines of the airline passenger suite.

It is a further object of the invention to provide a premium class aircraft passenger suite table arrangement that provides two completely separate seated positions, both with a proper chair, within the passenger suite.

It is a further object of the invention to provide a premium class aircraft passenger suite with separate positions for the premium class passengers within their space and that encourages the passengers to get up and move about within the suite, which may reduce the incidence of deep vein thrombosis (DVT) caused by sitting in the same position for long periods time. Therefore, it is an object of the present invention to provide a premium class aircraft passenger suite that includes a main passenger seat and a work/dining table that deploys for use by the occupant of the main passenger seat.

It is a further object of the present invention to provide a premium class aircraft passenger suite that includes a main passenger seat and dining table that deploys for use by the occupant of the main passenger seat, and that includes the passenger seat controls as a part of the dining table deployment mechanism.

It is a further object of the invention to provide a premium class aircraft passenger suite with a dining table and with passenger seat controls that occupy a minimum of space, thereby permitting additional space to be used for different purposes.

These and other objects and advantages are achieved by providing a passenger suite, which may be a premium class aircraft passenger suite, that includes first and second spaced-apart end walls defining an at least partial enclosure adapted to be positioned along a longitudinal axis of an aircraft cabin. A first seating assembly is positioned in the enclosure adjacent the first end wall of the passenger suite and faces towards the second end wall along the longitudinal axis of the aircraft cabin. A second seating assembly is positioned in the enclosure adjacent the second end wall of the passenger suite and faces in a direction generally perpendicular to the longitudinal axis of the aircraft cabin. A first table is positioned in the enclosure for use by an occupant seated in the first seating assembly, and a second table is positioned in the enclosure for use by an occupant seated in the second seating assembly.

According to another preferred embodiment of the invention, the first seating assembly includes a main seat movable among upright and recline positions and adapted for occupant use during taxi, take-off and landing, and the second seating assembly includes a work/dining chair. The first table comprises a main table for use by an occupant of the main seat, and the second table comprises a work/dining table for use by an occupant of the work/dining chair.

According to another preferred embodiment of the invention, an elongate cabinet is provided and extends along a length of the suite between the first and second end walls. The main table is movable between a stowed position on the cabinet and a deployed use position in front of the main seat, and the work/dining table is positioned on the elongate cabinet opposite the work/dining chair and is movable between a stowed position above the cabinet and a deployed use position between the cabinet and the work/dining chair.

According to another preferred embodiment of the invention, a bed is provided having a flexible mattress of predetermined dimensions that is movable between a stowed position to one side of the main seat, and a deployed position above and separate from the main seat. The main seat is configured to be movable between a seating position when the bed is stowed, and a stowed position with a lowered seat back when the bed is deployed for use, the seat in its stowed position being beneath and separate from the bed.

According to another preferred embodiment of the invention, the work/dining chair is positioned adjacent the second end wall of the suite and faces in a direction perpendicular to the main seat. The work/dining table is positioned on the elongate cabinet opposite the work/dining chair and is movable between a stowed position above the cabinet and a deployed use position between the cabinet and the work/dining chair. The main table is positioned in the enclosure for use either by an occupant seated in the main seat or an occupant seated in the work/dining chair.

According to another preferred embodiment of the invention the main table is mounted on the cabinet on a pivot arm carried by the cabinet that rotates about a first pivot assembly to deploy the main table to a center line in front of the main seat and on a second pivot assembly adapted to allow the table to be positioned parallel to its use position throughout its range of deployment.

According to another preferred embodiment of the invention, the main table includes a cable positioned to extend around a center of rotation of a pinion gear positioned in a geared rack carried operatively associated with the first pivot assembly whereby rotational movement of the first pivot assembly translates through the cable, turning the pinion gear and driving the table inwardly or outwardly on the rack to deploy and stow the table, respectively.

According to another preferred embodiment of the invention, first and second spaced-apart end walls define an at least partial enclosure adapted to be positioned along a longitudinal axis of an aircraft cabin. A first seating assembly is positioned in the enclosure adjacent the first end wall of the passenger suite and facing in a first direction. A second seating assembly is positioned in the enclosure adjacent the second end wall of the passenger suite and faces in a second direction generally perpendicular to the first direction. A first table is positioned in the enclosure for use by an occupant seated in the first seating assembly, and a second table is positioned in the enclosure for use by an occupant seated in the second seating assembly.

According to another preferred embodiment of the invention, the first seating assembly includes a main seat selectively moveable between an upright taxi, take-off and landing position and a recline position. The second seating assembly includes a work/dining seat having a seat bottom and upright seat back, and a storage box is provided that serves as a base for supporting the seat bottom in a use position.

According to another preferred embodiment of the invention, a slidable side privacy panel is provided that cooperates with at least one of the first and second spaced-apart end walls to form a partial enclosure.

According to another preferred embodiment of the invention, the seat bottom of the work/dining chair is moveable between a lowered use position and any upright storage position next to the seat back.

BRIEF DESCRIPTION OF DRAWINGS

The present invention is best understood when the following detailed description of the invention is read with reference to the accompanying drawings, in which.

DETAILED DESCRIPTION OF THE PREFERRED EMBODIMENT

Figure 1:
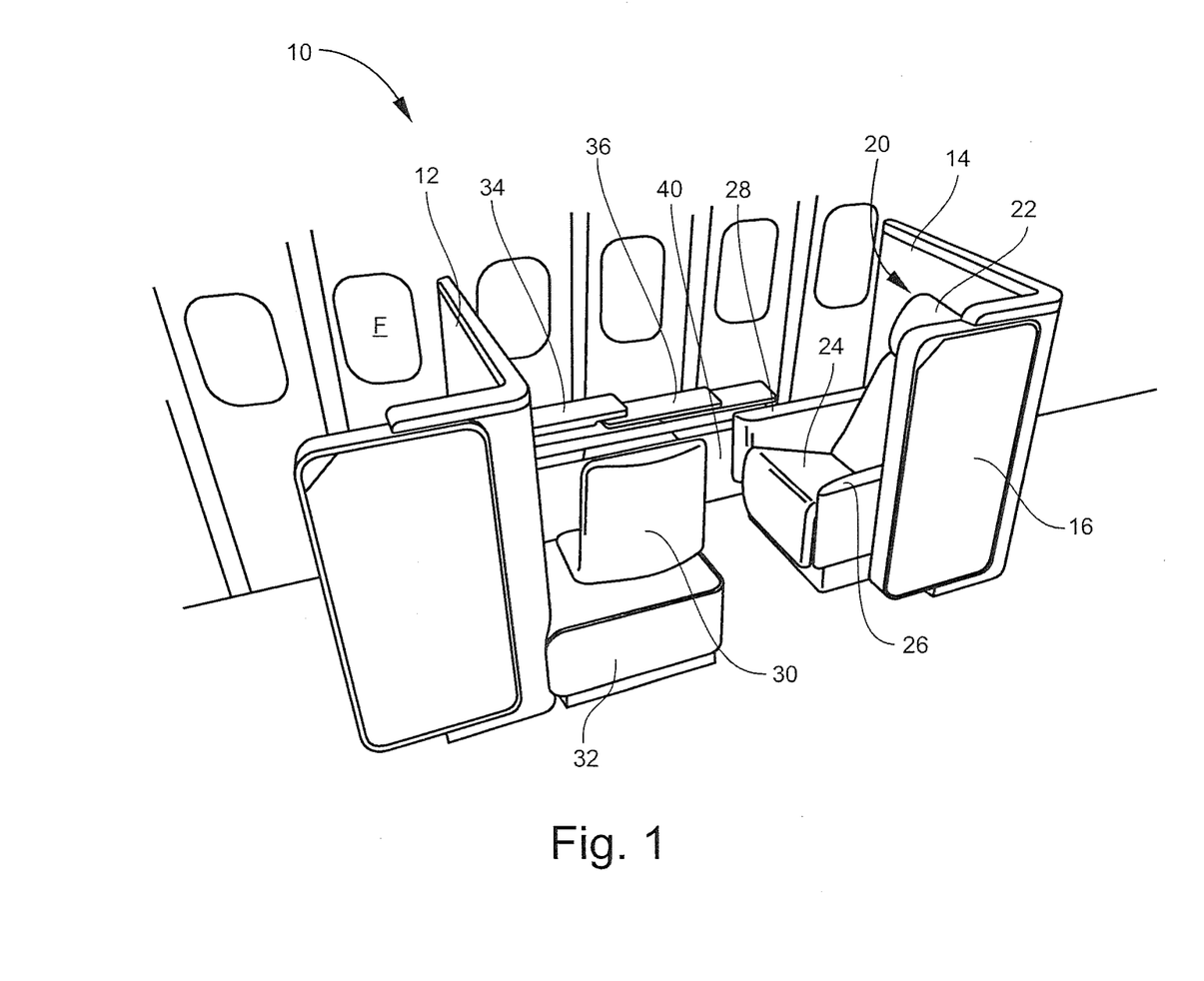
FIG. 1 is a perspective view of a premium class aircraft passenger suite in the seating configuration.

Referring now to the drawings, a passenger suite 10 is shown, and includes front and rear privacy panels 12, 14 and a slidable side privacy panel 16 that together form a partial enclosure. The suite 10 in FIGS. 1 and 2 views extends along a length of the aircraft fuselage "F", which forms one side of the suite 10. By "passenger suite" is meant a seating area for at least one passenger that includes amenities in addition to a single seat and associated table positioned in at least a partial enclosure.

A main seat 20 that includes a seat back 22, seat bottom 24, and left and right armrests 26, 28 is provided for passenger use during taxi, take-off, landing and in-flight relaxation, video viewing, upright or semi-reclined reading and the like. A work/dining chair 30 sits on a storage box 32 at right angles to the main seat 20. The suite 10 also contains work/dining tables 34, 36, a video display monitor, main seat controls and electronics controls, not shown. The terms "main seat 20" and "work/dining chair 30" are used to provide descriptive clarity between these two seating assemblies.

Figure 2:
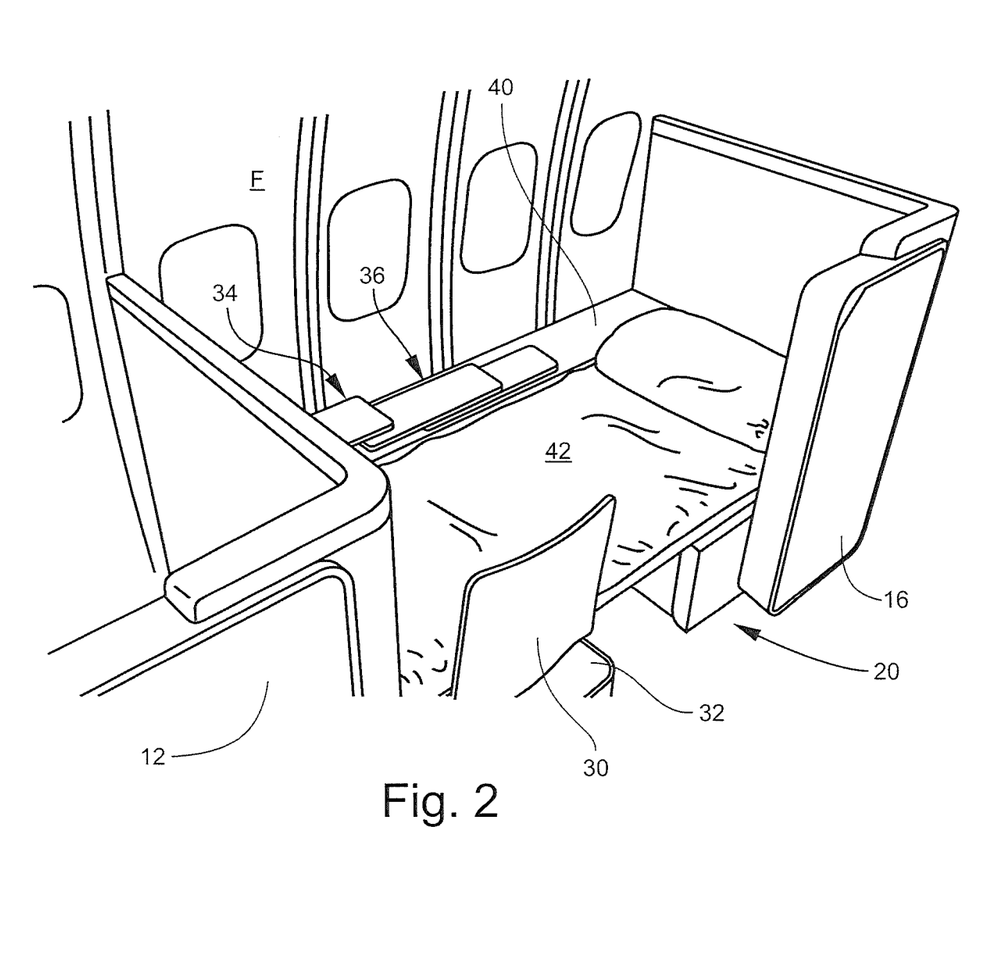
FIG. 2 is a perspective view of the premium class aircraft passenger suite according to FIG. 1 in the deployed bed configuration.

As shown in FIG. 2, an elongate cabinet 40 extends along the length of the suite 10 adjacent the aircraft fuselage "F" and contains a roll-out membrane bed 42.

The main seat 20 and bed 42 are separate elements. The seat back 22 folds forward, stowing face down above the seat bottom 24, and at the same time the left and right armrests 26, 28 are lowered, making space for the roll-out membrane bed 42. As is best shown by comparing FIG. 1 and FIG. 2, the bed 42 occupies the space above the folded seat back 22 and the space that was previously occupied by the seat back 22 in its upright position when in use as the seat. As is also shown, the foot end of the bed 42 is supported over the work/dining chair 30. The movement of the seat bottom 24, seat back 22 and deploying bed 42 are electronically driven, interlinked and operated by a single switch.

When the bed 42 is deployed, a 2 inch gap is provided between the stowed surface of the seat back 22 and the underside of the bed 42. This 2 inch gap allows for a deflection of the bed 42 to create comfort for the recumbent passenger.

The bed 42 is formed in one complete flexible surface that includes an underlying membrane 44 that supports a mattress 46, without joints in the mattress 46, as opposed to combination multiple padded surfaces, such as is common in lay-flat aircraft seating. A suitable material for use as the membrane 44 is a synthetic polymer sold under the trademark Krystal-Flex. By designing the main seat 20 and the bed 42 as separate elements that do not need to convert from one use to another, each can be designed to optimize the comfort for its intended use. The bed 42 stows in a compact space within the cabinet 40 that is approximately 8.7 inches wide. The bed 42 deploys with the sheet or other bed coverings attached to it ready for the passenger to use.

Figure 3:
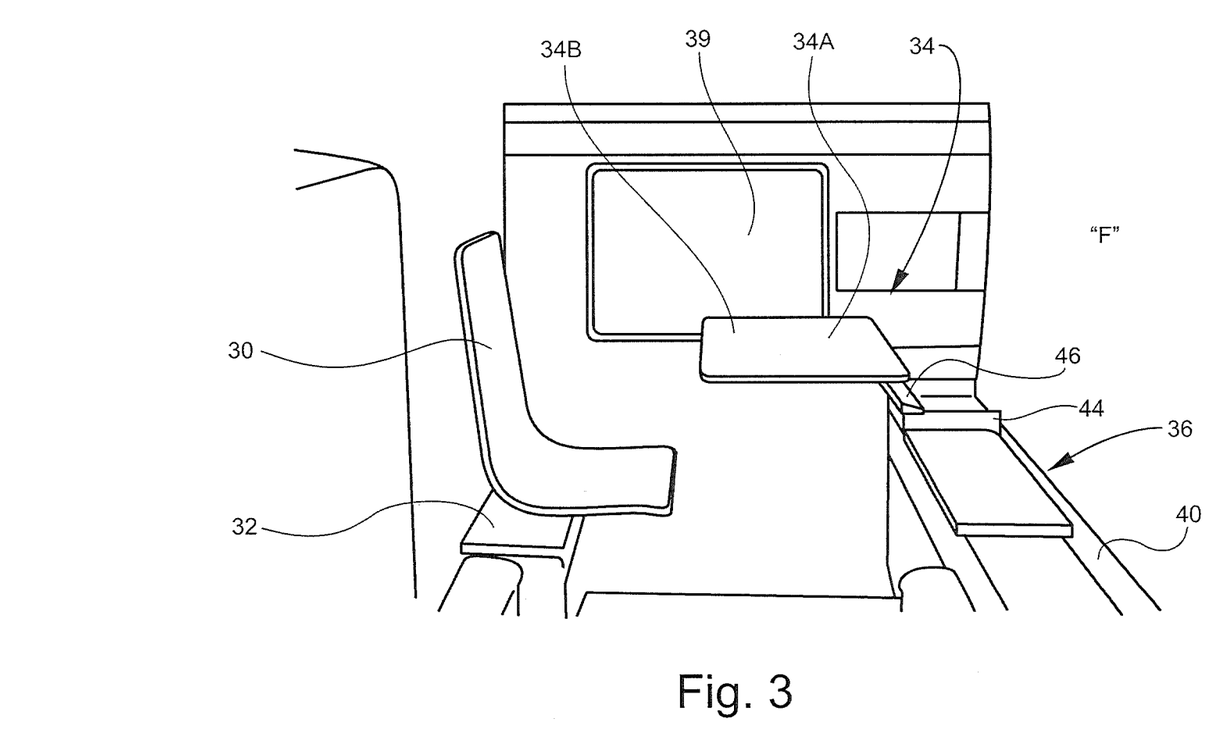
FIG. 3 is a perspective view of the premium class aircraft passenger according to FIG. 1 showing deployment of the work/dining chair and table.

As best shown in FIGS. 2 and 3, the table 34 is normally positioned in a folded, stowed position in a bracket 44 and is formed of two table panels 34A, 34B attached by a piano-type hinge that permits the table panel 34B to be opened into the position shown in FIG. 3. The table 34 is further deployed by pulling the table out and away from the cabinet 40 by means of the bracket 44. The bracket 44 includes a pair of arms 46 (one shown) that permits the table 34 to both move forwardly towards the work/dining chair 30 and elevate into a proper work/dining height. Table 34 is thus ideally suited for use as a work/dining table. The work/dining chair 30 provides the passenger with a comfortable chair with an upright back that provides proper support. FIG. 3 also shows a video display 39 mounted on the privacy panel 12 in a suitable position for viewing by the occupants of the main seat 20 and chair 30.

Figure 4:
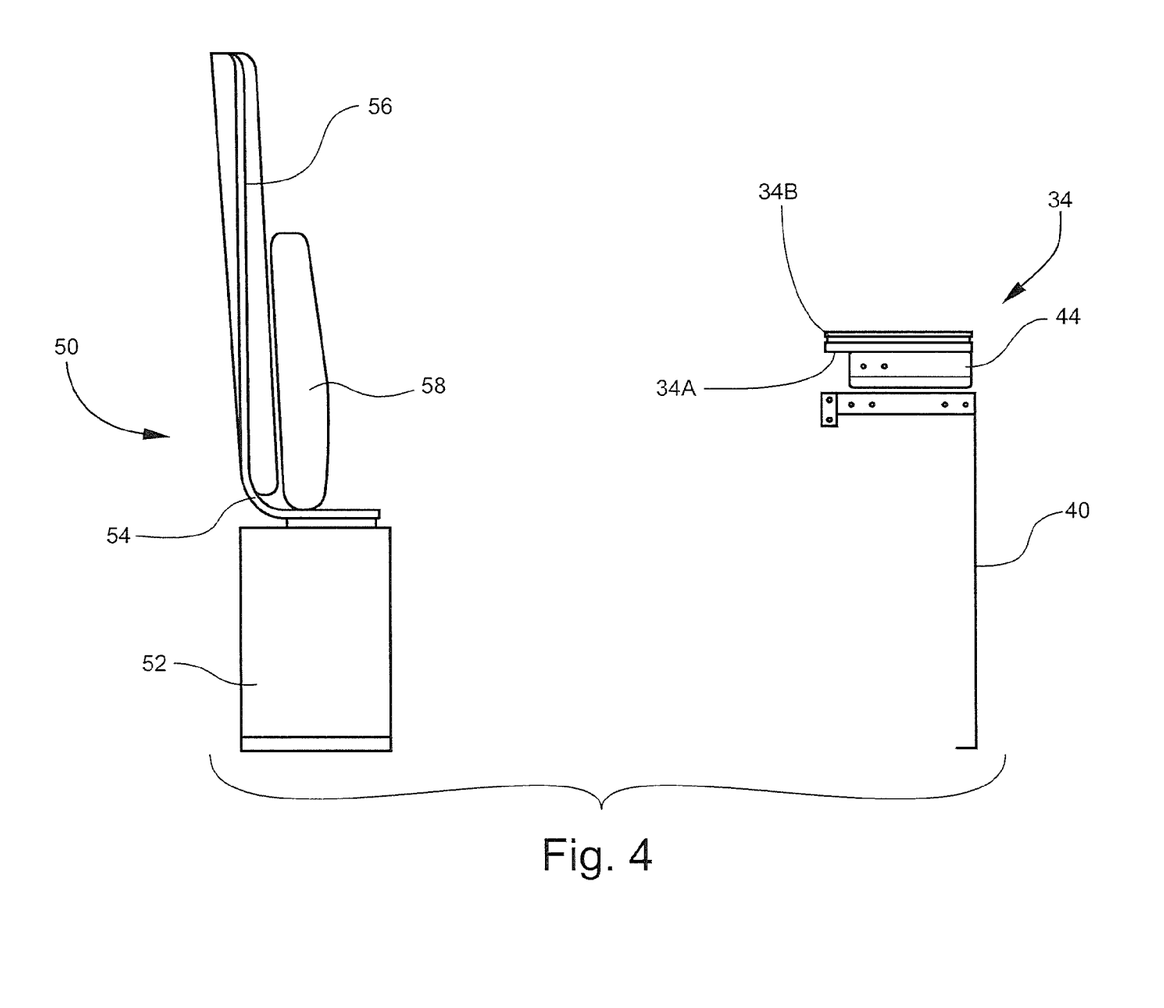
FIG. 4 is a fragmentary schematic side elevation of the work/dining chair and table in their respective stowed positions.
Figure 5:
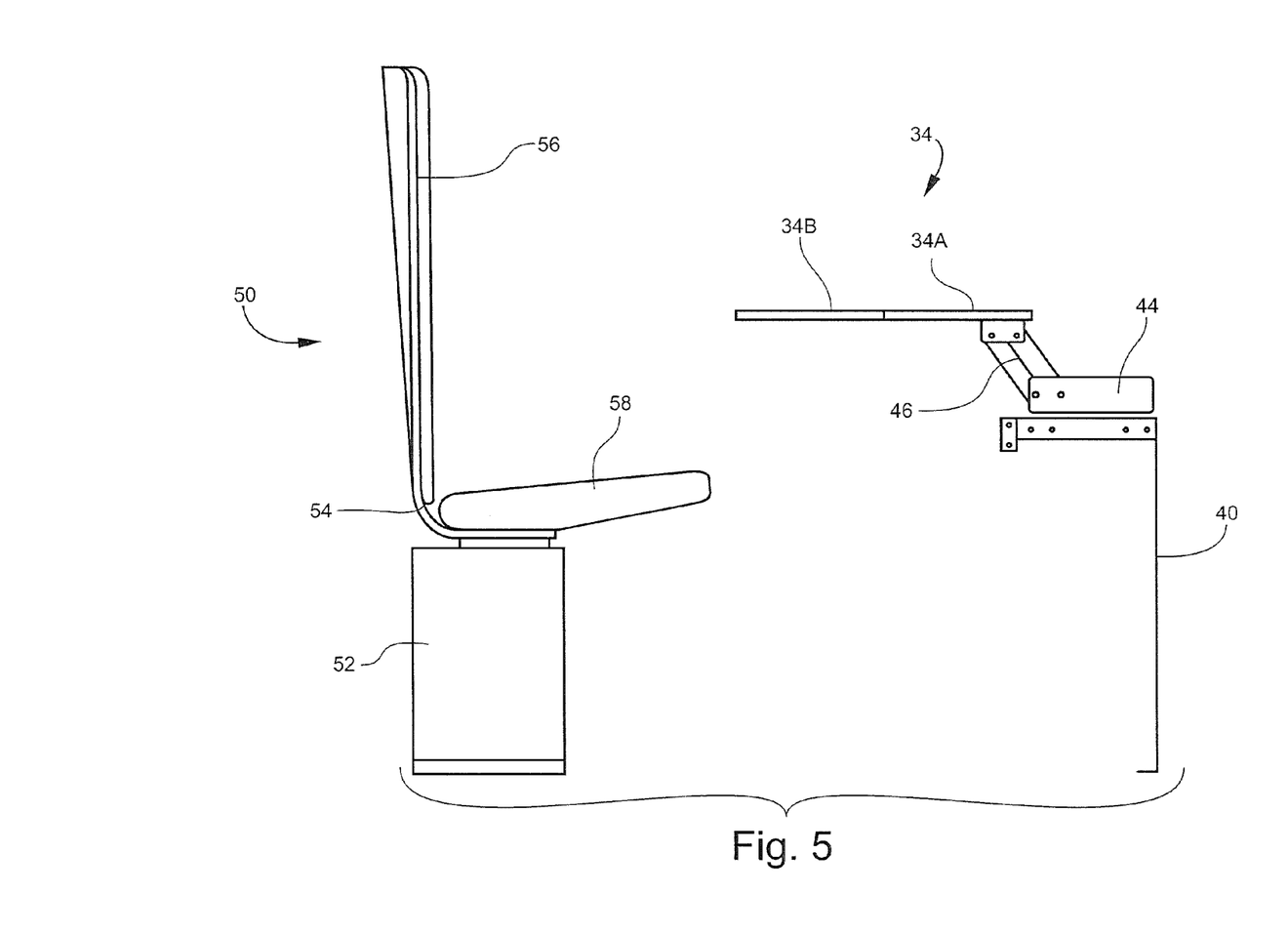
FIG. 5 is a fragmentary schematic side elevation of the work/dining chair and table in their respective deployed positions, as in FIG. 3.

FIG. 4 shows the table 34 in its stowed position on the cabinet 40. A work/dining chair 50 according to an alternative embodiment is also shown in FIGS. 4 and 5. Chair 50 includes a base 52, and an L-shaped support structure 54. The support structure 54 supports an upright seat back 56 and a seat bottom 58 that is movable between a stowed position, FIG. 4, and a deployed use position, FIG. 5. Note, also, the table 34 in its deployed position in FIG. 5.

Figure 6:
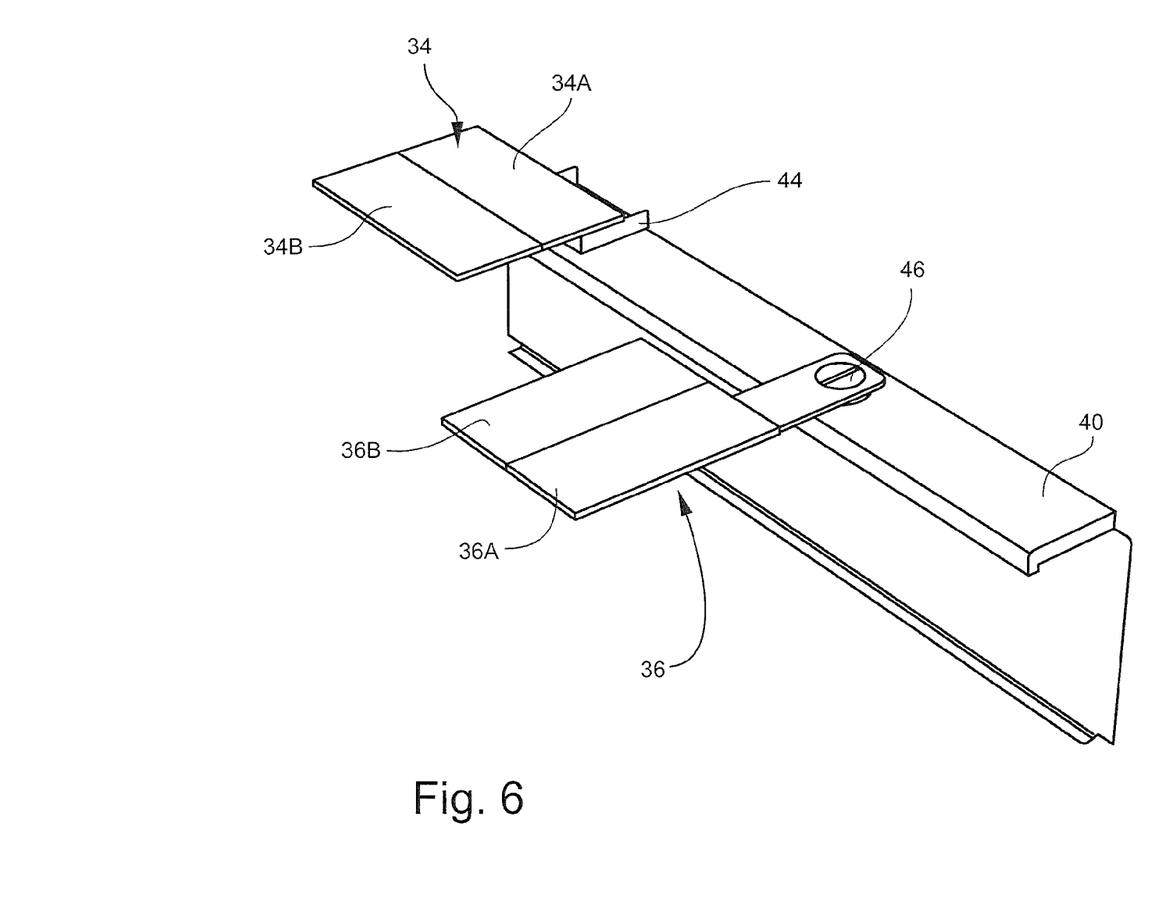
FIG. 6 is a fragmentary perspective view looking down into a premium class aircraft passenger suite, showing two tables in their respective stowed positions.
Figures 7, 8:
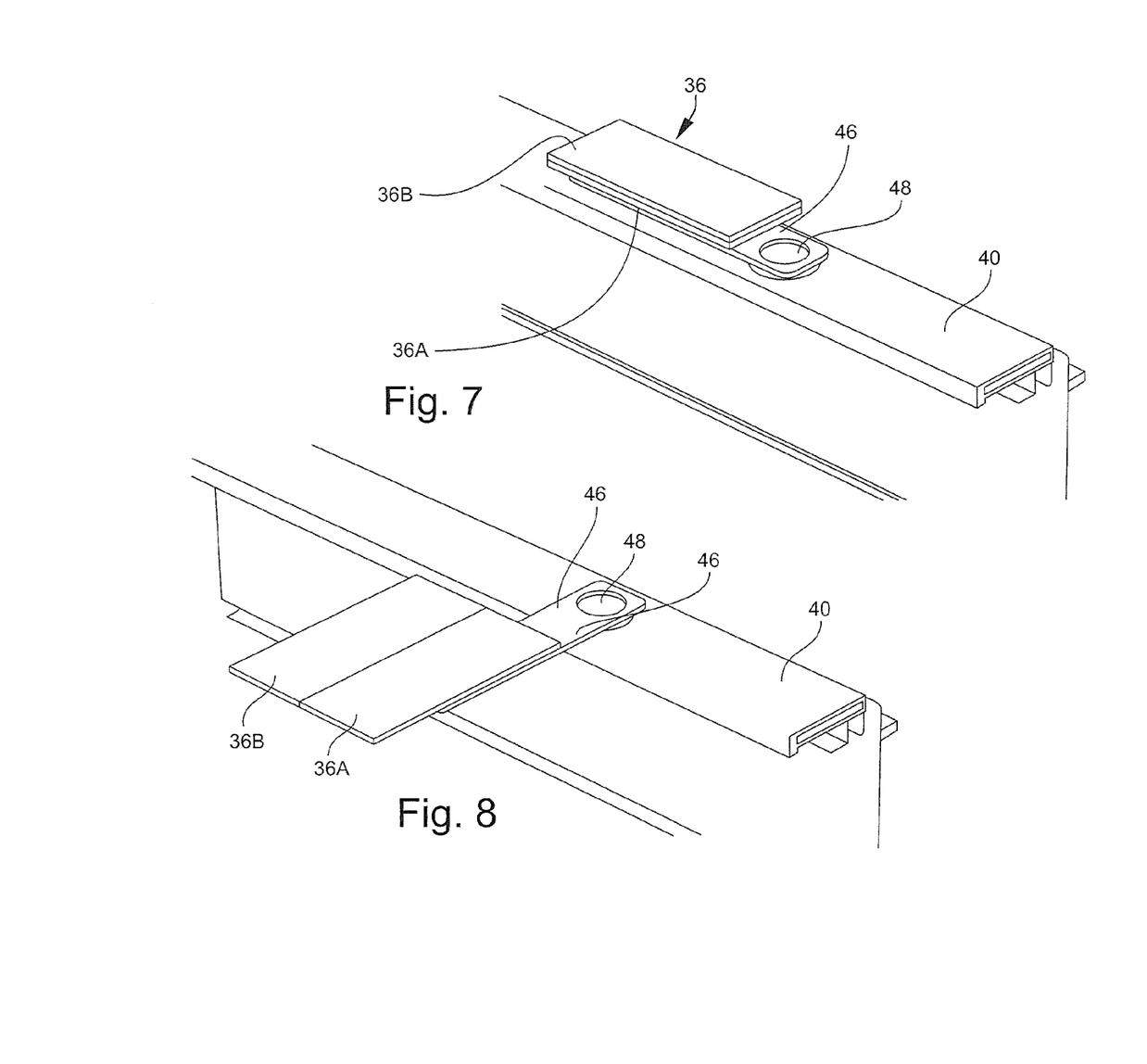
FIG. 7 is a fragmentary perspective view showing the main passenger seat table in its stowed position.
FIG. 8 is a fragmentary perspective view showing the main passenger seat table in its deployed position.

Referring now to FIG. 6, the passenger seated in the work/dining chair 30 can also use the table 36, ordinarily intended for use by the occupant of the main seat 20, as a further work or meal surface while also using the table 34. Table 36 is mounted on the cabinet 40 on a pivot arm 46 and is formed of two table panels 36A, 36B attached by a piano-type hinge that permits the table panel 36B to be opened from the position shown in FIG. 7 into the position shown in FIG. 8. In an alternative arrangement, another passenger may sit in the main seat 20 and, by rotating the table 36 into position in front of the main seat 20, also use the table 36 as a meal or work table.

Referring now generally to FIGS. 9-15, the table 36 is mounted on the cabinet 40 on a pivot arm 46 that rotates about a pivot point 48. In order to deploy the table 36 to the center line of the main seat 20, the table 36 automatically extends from its stowed pivot point 48 on the cabinet 40 as it deploys, as is shown by comparing the position of the table 36 in FIGS. 7 and 8.

Figures 9, 10:
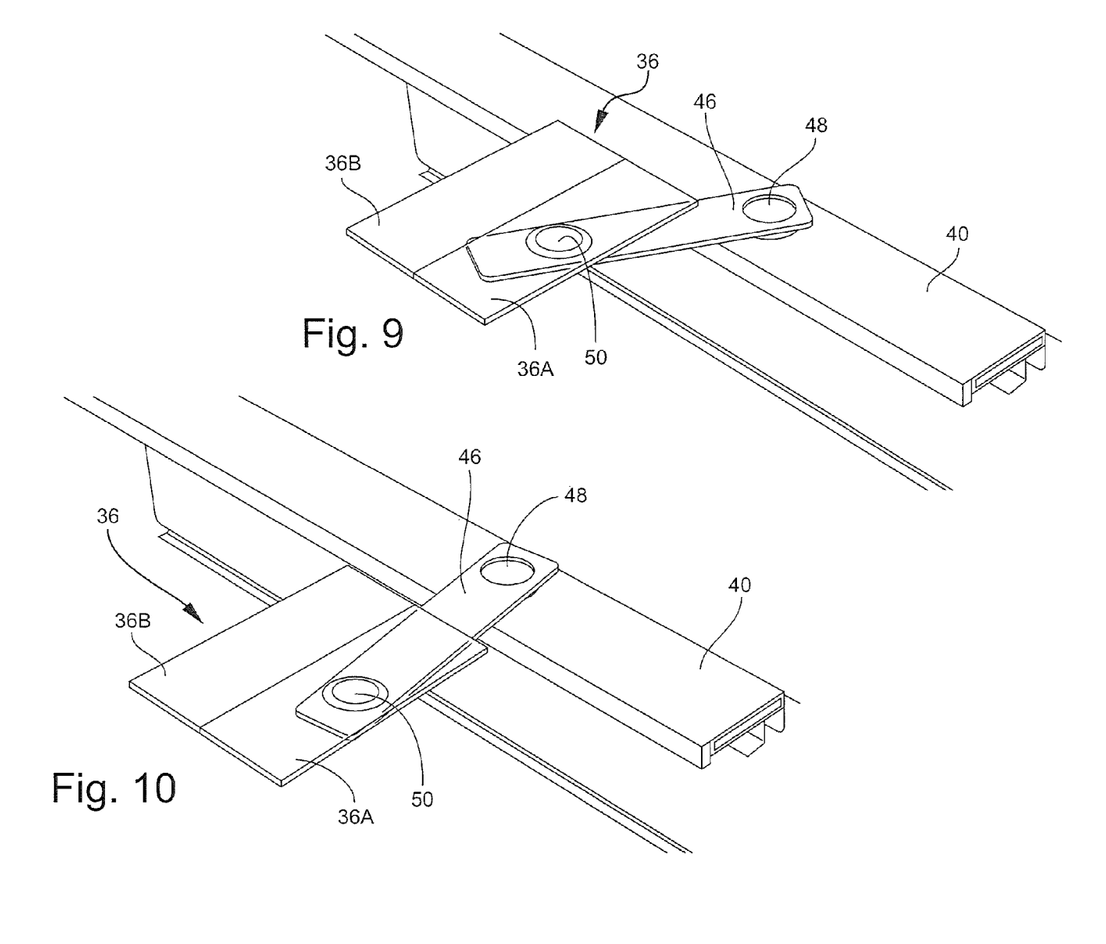
FIGS. 9 and 10 are fragmentary perspective views with parts broken away showing the alignment of the table with the main passenger seat during deployment.

As is best shown in FIGS. 9 and 10, the table 36 has a second pivot point 50 positioned below the table panels 36A, 36B. This second pivot point 50 allows the table 36 to be positioned parallel to its use position throughout its range of deployment.

Figure 11:
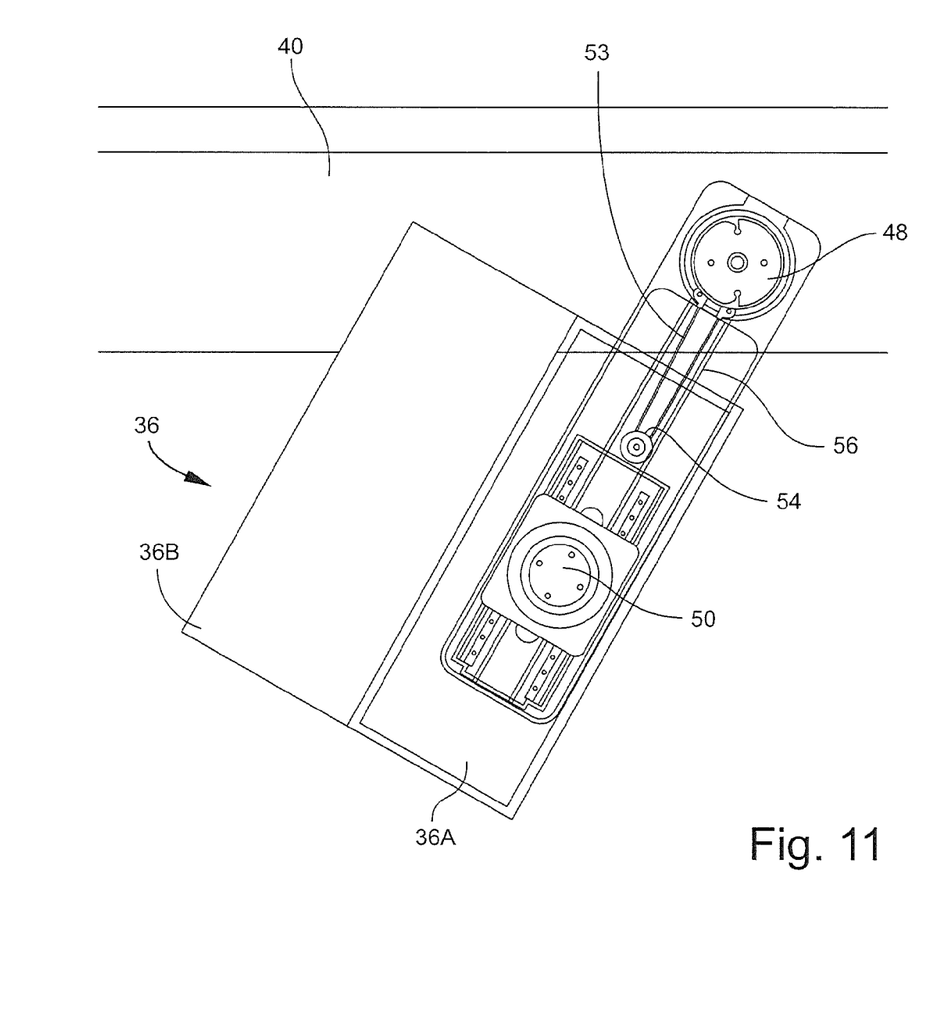
FIG. 11 is a top plan view of the table during deployment showing a cable drive apparatus that extends the table outwardly away from its pivot point as it rotates.
Figure 12:
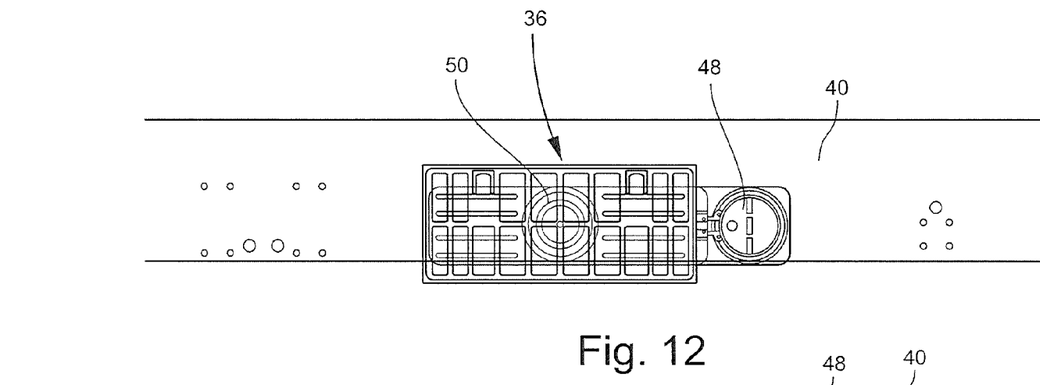
FIGS. 12 and 13 are top plan views of the table in its stowed position and as it is deploying and the table is extending outwardly from its pivot point.
Figure 13:
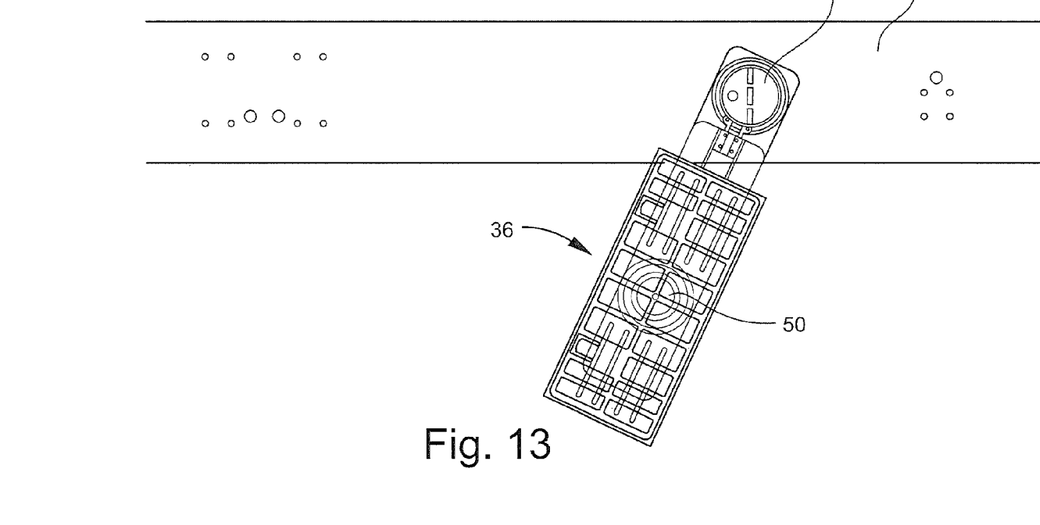

As is best shown in FIG. 11, a cable 52 extends around the center of rotation of a pinion gear 54 positioned in a geared rack 56. The rotational movement of the pivot point 48 translates through the cable 52, turning the pinion gear 54 and driving the table 36 outwardly on the rack 56. The table 36 operates in reverse as the table 36 is stowed. See also FIGS. 12 and 13.

Figure 14:
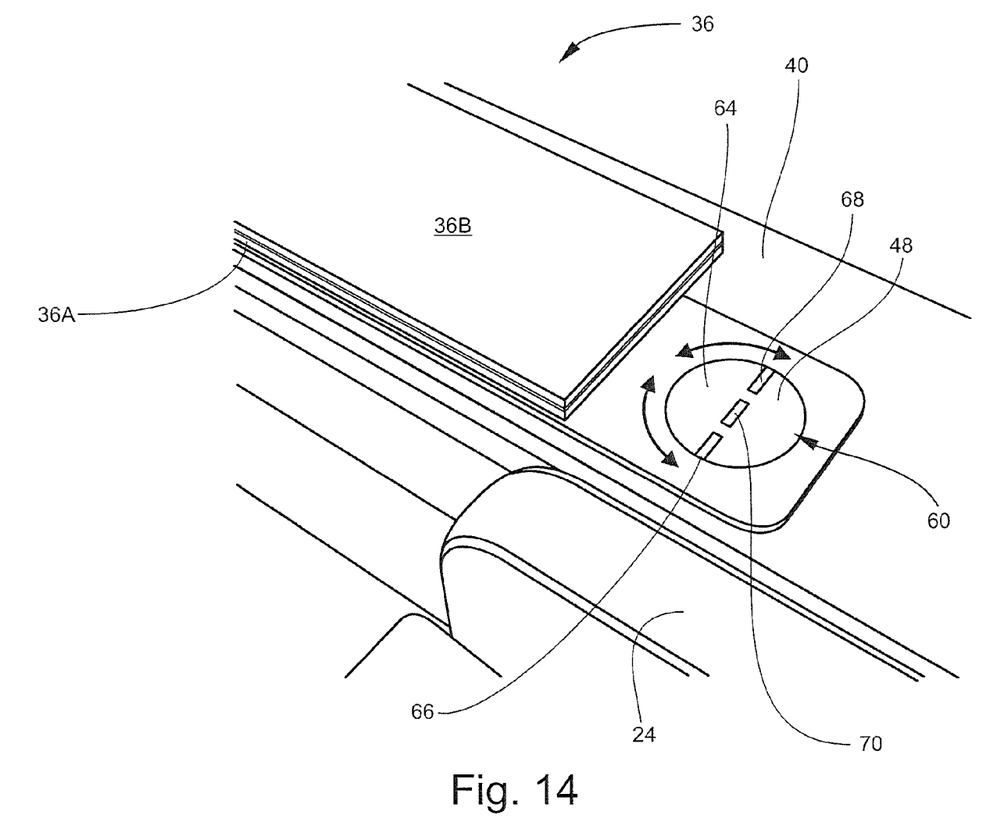
FIG. 14 is a further detailed view of the passenger seat control console associated with the dining table.
Figure 15:
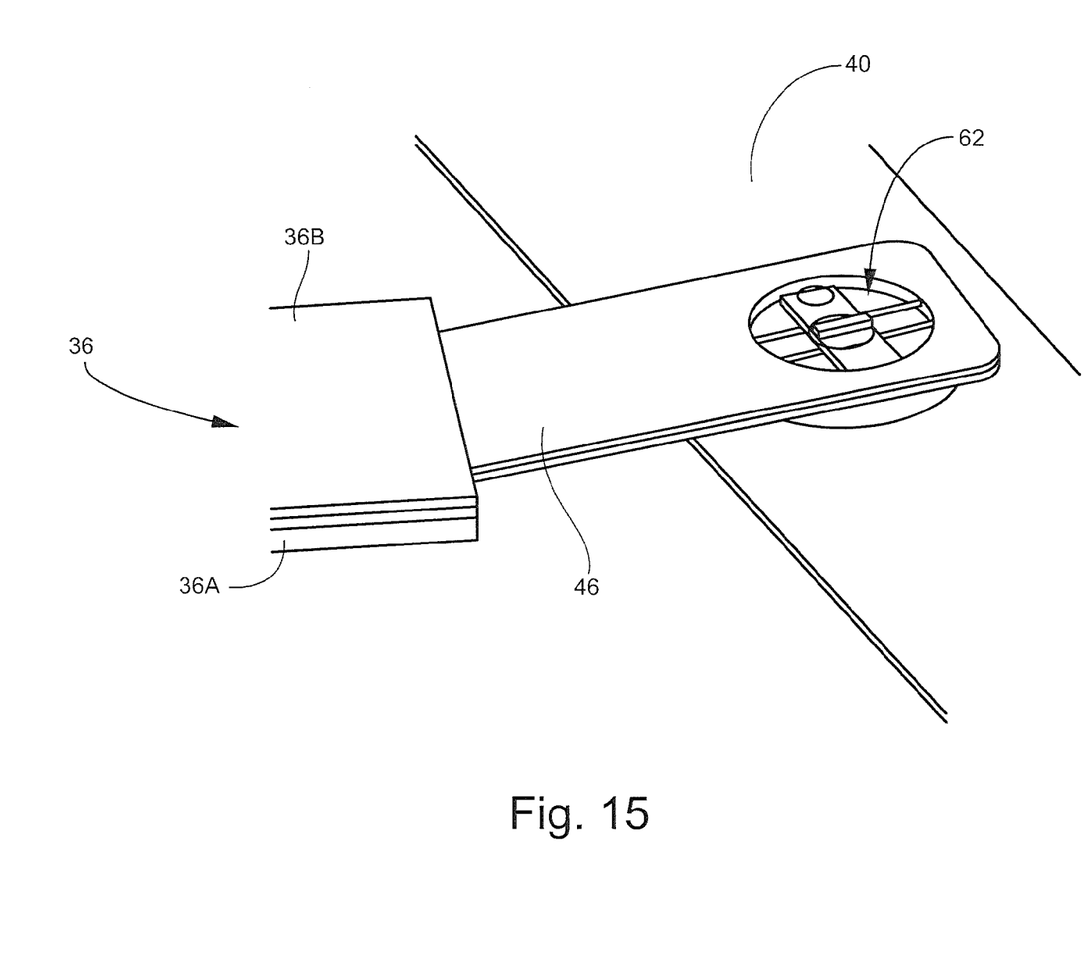
FIG. 15 is a fragmentary view of the seat control console, showing the recess in which the seat controls reside.

As shown in FIGS. 14 and 15, the pivot 48 includes a passenger-operated seat control disc 60 mounted in a recess 62, FIG. 15 on the pivot arm 46 concentric with the pivot 48. The seat control disc 60 is divided into sections that are manipulated to control the movement of the main seat 20. The control disc 60 is electrically-connected to motion control motors in the main seat 20 that are operable to move the main seat 20 as desired under the control of the switches.

As best shown in FIG. 14, the control disc 60 includes a depression 64 into which the passenger places a finger and rotates the control disc 60. A return spring, not shown, returns the control disc 60 to its centered position upon release. Rotating the control disc 60 clockwise moves the seat back forward, while rotating the control disc 60 counterclockwise moves the seat back into its recline position.

A switch 66 moves the headrest forwardly or rearwardly when depressed, and a switch 68 moves the lumbar section of the seat back 22 in or out as desired by the seat occupant. A switch 70 located in the center of the control disc 60 returns the main seat 20 to the taxi, take off and landing position with the seat back 22 forward. Placing the seat controls in the area of the pivot 48 allows the remaining area around the pivot to be used by the passenger for other purposes.

A passenger seat for a premium class aircraft passenger suite having seat-mounted passenger seat controls according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:
1. A passenger suite comprising:
(a) first and second spaced-apart end walls defining an at least partial enclosure adapted to be positioned along a longitudinal axis of an aircraft cabin;
(b) a first seating assembly positioned in the enclosure adjacent the first end wall of the passenger suite, and the first seating assembly comprising a seat arranged parallel to the longitudinal axis of the aircraft cabin and facing the second end wall, wherein the seat of the first seating assembly is a main seat movable among upright and recline positions and adapted for occupant use during taxi, take-off and landing;
(c) a second seating assembly positioned in the enclosure adjacent the second end wall of the passenger suite, the second seating assembly comprising a seat arranged perpendicular to the longitudinal axis of the aircraft cabin and facing away from an aisle laterally adjacent the passenger suite, wherein the seat of the second seating assembly is a work/dining chair positioned adjacent the second end wall of the suite and faces in a direction perpendicular to the main seat;
(d) a first table positioned in the enclosure for use by an occupant seated in the first seating assembly or by an occupant seated in the work/dining chair, wherein the first table comprises a main table for use by an occupant of the main seat; and
(e) a second table positioned in the enclosure for use by an occupant seated in the second seating assembly, wherein the second table is a work/dining table positioned on an elongate cabinet opposite the work/dining chair and is movable between a stowed position above the cabinet and a deployed use position between the cabinet and the work/dining chair for use by an occupant of the work/dining chair;
(f) wherein all portions of both the first table and the second table are simultaneously and actively usable by the occupant seated in the second seating assembly, and wherein:
the main table is mounted on the cabinet on a pivot arm carried by the cabinet that rotates about a first pivot assembly to deploy the main table to a center line in front of the main seat;
the main table is mounted on a second pivot assembly adapted to allow the table to be positioned parallel to its use position throughout its range of deployment; and
a cable is positioned to extend around a center of rotation of a pinion gear positioned in a geared rack carried operatively associated with the first pivot assembly whereby rotational movement of the first pivot assembly translates through the cable, turning the pinion gear and driving the table inwardly or outwardly on the rack to deploy and stow the table, respectively.

2. The passenger suite of claim 1, further comprising:
(a) a bed having a flexible mattress of predetermined dimensions and movable between a stowed position to one side of the main seat, and a deployed position above and separate from the main seat; and
(b) the main seat configured to be movable between a seating position when the bed is stowed, and a stowed position with a lowered seat back when the bed is deployed for use, the seat in its stowed position being beneath and separate from the bed.

3. The passenger suite according to claim 1, further comprising:
(a) the seat of the second seating assembly is a work/dining seat having a seat bottom and upright seat back; and (b) a storage box for supporting the seat bottom in a use position.

4. A The passenger suite according to claim 1, further comprising a slidable side privacy panel, wherein a seatback of the second seating assembly and the slidable privacy panel cooperatively close off an opening of the passenger suite to a laterally adjacent aisle.

5. The passenger suite according to claim 3, wherein the seat bottom of the work/dining chair is moveable between a lowered use position and an upright storage position next to the seat back.

6. A passenger suite, comprising:
   (a) first and second spaced-apart end walls defining an at least partial enclosure adapted to be positioned along a longitudinal axis of an aircraft cabin;
   (b) an elongate cabinet extending along a length of the suite between the first and second end walls;
   (c) a first seating assembly positioned in the enclosure adjacent the first end wall of the passenger suite, and the first seating assembly comprising a seat arranged parallel to the longitudinal axis of the aircraft cabin and facing the second end wall;
   (d) a second seating assembly positioned in the enclosure adjacent the second end wall of the passenger suite, the second seating assembly comprising a seat arranged perpendicular to the longitudinal axis of the aircraft cabin and facing away from an aisle laterally adjacent the passenger suite;
   (e) a first table being a main table positioned in the enclosure for use by an occupant seated in the first seating assembly; and
   (f) a second table positioned in the enclosure for use by an occupant seated in the second seating assembly, wherein:
   the main table is mounted on the cabinet on a pivot arm carried by the cabinet that rotates about a first pivot assembly to deploy the main table to a center line in front of the seat of the first seating assembly;
   the main table is mounted on a second pivot assembly adapted to allow the table to be positioned parallel to its use position throughout its range of deployment; and
   a cable is positioned to extend around a center of rotation of a pinion gear positioned in a geared rack carried operatively associated with the first pivot assembly whereby rotational movement of the first pivot assembly translates through the cable, turning the pinion gear and driving the table inwardly or outwardly on the rack to deploy and stow the table, respectively.

7. The passenger suite of claim 6 further comprising:
   (a) a bed having a flexible mattress of predetermined dimensions and movable between a stowed position to one side of the main seat, and a deployed position above and separate from the main seat; and
   (b) the main seat configured to be movable between a seating position when the bed is stowed, and a stowed position with a lowered seat back when the bed is deployed for use, the seat in its stowed position being beneath and separate from the bed.

8. The passenger suite of claim 6 further comprising:
   (a) the seat of the second seating assembly is a work/dining seat having a seat bottom and upright seat back; and
   (b) a storage box for supporting the seat bottom in a use position.

9. The passenger suite according to claim 8, wherein the seat bottom of the work/dining chair is moveable between a lowered use position and an upright storage position next to the seat back.

10. The passenger suite according to claim 6, further comprising a slidable side privacy panel, wherein a seatback of the second seating assembly and the slidable privacy panel cooperatively close off an opening of the passenger suite to a laterally adjacent aisle.

\* \* \* \* \*